United States Patent
Upadhyay et al.

(10) Patent No.: US 9,367,489 B1
(45) Date of Patent: Jun. 14, 2016

(54) ADJUSTING THE SIZE OF A MEDIA PRESENTATION RECEIVED BY A MOBILE DEVICE

(75) Inventors: Piyush Upadhyay, Mission, KS (US); Badri P Subramanyan, Overland Park, KS (US); John W Davis, Kansas City, MO (US); Ayodeji Abidogun, Overland Park, KS (US); William J Routt, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 449 days.

(21) Appl. No.: 12/132,400

(22) Filed: Jun. 3, 2008

(51) Int. Cl.
*G06F 13/00* (2006.01)
*G06F 13/10* (2006.01)
*G06F 13/38* (2006.01)

(52) U.S. Cl.
CPC .............. *G06F 13/10* (2013.01); *G06F 13/385* (2013.01)

(58) Field of Classification Search
CPC ............................... G06F 13/10; G06F 13/385
USPC .......................................... 710/66, 30, 33, 65
See application file for complete search history.

(56) References Cited

U.S. PATENT DOCUMENTS

| | | | |
|---|---|---|---|
| 2005/0091693 A1* | 4/2005 | Amine et al. ................. | 725/100 |
| 2006/0055693 A1* | 3/2006 | Sylthe et al. ................. | 345/419 |
| 2008/0189752 A1* | 8/2008 | Moradi et al. ................ | 725/105 |
| 2009/0259766 A1* | 10/2009 | Karlsson et al. ............. | 709/231 |

* cited by examiner

*Primary Examiner* — Zachary K Huson

(57) ABSTRACT

A method, system, and medium are provided for changing the size of media content sent to a mobile device during a media session. In one embodiment, during the media session, the mobile device requests media content that has a second size. In response to the request, the content provider transmits the media content having the second size and discontinues transmission of the media content having the first size. The size of the media content transmitted to the mobile device may be changed multiple times during the presentation of the media content.

19 Claims, 4 Drawing Sheets

ADJUSTING THE SIZE OF A MEDIA PRESENTATION RECEIVED BY A MOBILE DEVICE

SUMMARY

The present invention is defined by the claims below. Embodiments of the present invention adjust the screen size of the media presentation received by a mobile device while the media session is ongoing. Embodiments of the present invention have several practical applications in the technical arts including reducing the bandwidth used while streaming a media presentation to a mobile device. Specifically, one embodiment changes the screen size of the media presentation being sent to the mobile device upon receiving a message from the mobile device including a request for a new screen size.

In a first illustrative embodiment, one or more computer-readable media having computer-executable instructions embodied thereon for performing a method of changing a screen size for a media content during a media session presented on a mobile device is provided. The method includes receiving the media content with a first screen size from a content provider and sending a request to the content provider to provide the media content with a second screen size, wherein the first screen size is different than the second screen size. The method also includes, in response to the request, receiving the media content with the second screen size from the content provider. The method further includes displaying the media content with the second screen size on the mobile device.

In another illustrative embodiment, one or more computer-readable media having computer-executable instructions embodied thereon for performing a method of changing a screen size of a media content sent from a content provider to a mobile device is provided. The method includes receiving a first request from the mobile device for the media content and transmitting the media content having a first screen size to the mobile device, wherein the mobile device receives the media content over a wireless connection. The method also includes during transmission of the media content having the first screen size, receiving a second request from the mobile device including a second screen size. The method further includes transmitting the media content having a third screen size to the mobile device.

In a third illustrative embodiment, a computerized system for transmitting media content to a mobile device is provided. The system including a content provider communicatively coupled to a wireless communications network that is communicatively coupled to the mobile device. The content provider includes an interface to receive a first request from the mobile device to initiate transmission of a media content. The first request contains a URL with capabilities of the mobile device. The interface also streams the media content with a first screen size based on the capabilities of the mobile device to the mobile device. The interface also receives a second request from the mobile device to change screen size of the media content to a second screen size. The second request includes the second screen size. The first screen size is different than the second screen size. The interface further streams the media content with the second screen size to the mobile device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
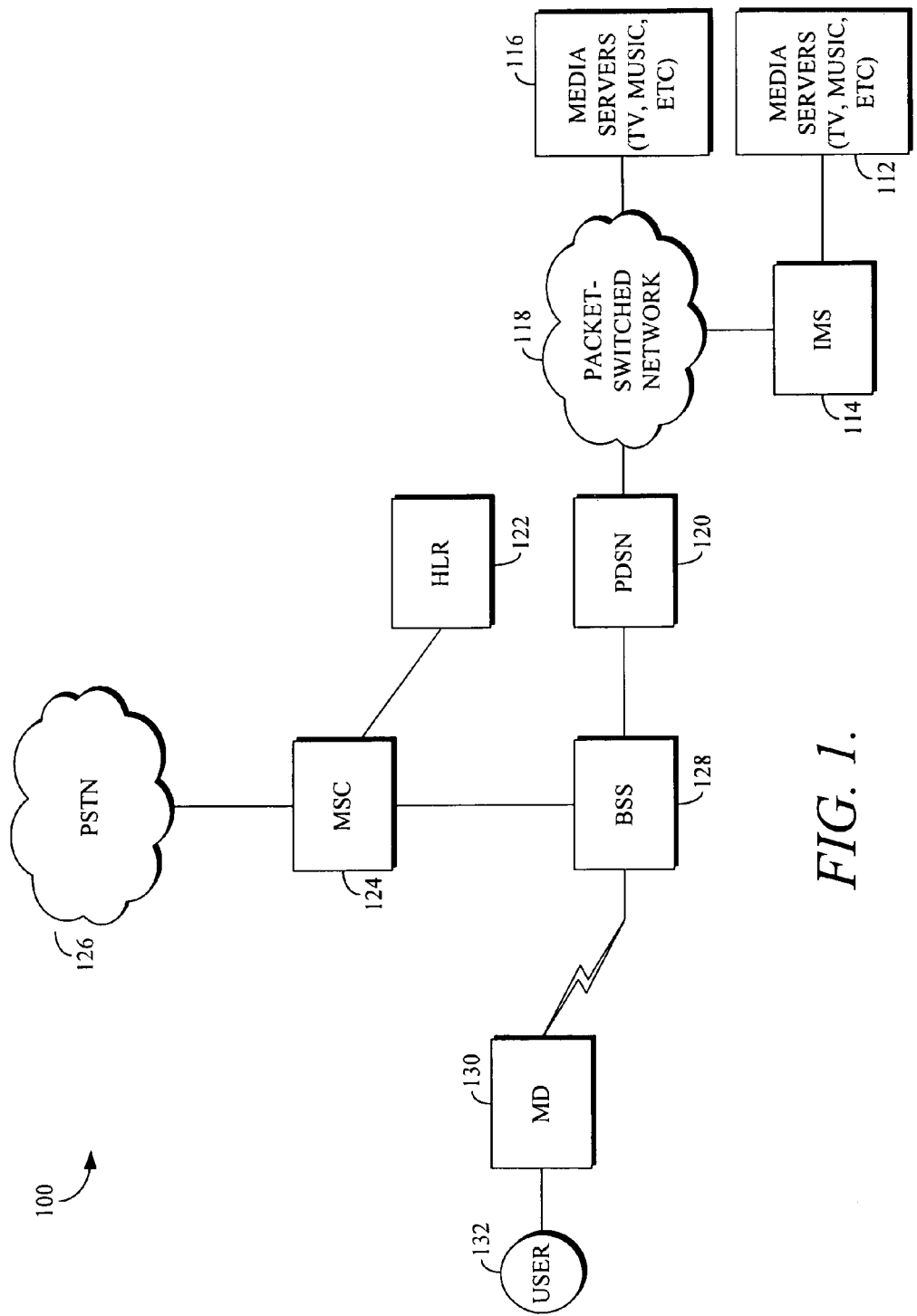
FIG. 1 is a drawing of an illustrative environment in which an embodiment of the present invention may operate.

Embodiments of the present invention provide systems and methods for adjusting the size of the media content being sent to a mobile device while the media session is ongoing. In an embodiment of the present invention, the media presentation is received by the mobile-communications device over a wireless connection. The size of the media presentation sent over the wireless network is adjusted to accommodate changes made to the size of the media presentation by the mobile device.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CPU | Central Processing Unit |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GSM | Global System for Mobile Communications |
| HLR | Home Location Register |
| IP | Internet Protocol |
| IETF | Internet Engineering Task Force |
| IMS | IP Multimedia Subsystem |
| LAN | Local Access Network |
| LCD | Liquid Crystal Display |
| MSC | Mobile Switching Center |
| PDA | Personal Digital Assistant |
| PDSN | Packet Data Serving Node/Home Agent |
| RAM | Random Access Memory |
| RTSP | Real Time Streaming Protocol |
| RTP | Real-Time Transport Protocol |
| ROM | Read Only Memory |
| SIP | Session Initiation Protocol |
| TDMA | Time Division Multiple Access |
| URL | Uniform Resource Locator |
| WAN | Wide Area Network |
| 3GPP | $3^{rd}$ Generation Partnership Project |

Further, various technical terms are used throughout this description. An illustrative resource that fleshes out various aspects of these terms can be found in *Newton's Telecom Dictionary* by H. Newton, $22^{nd}$ Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-executable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information, such as computer storage media. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Illustrative Operating Environment

Embodiments of the present invention may be practiced in a communications network providing service to mobile devices. An illustrative operating environment 100 that contains a few of the components within such a communication network is shown in FIG. 1. The components shown in FIG. 1 are the primary components the invention may interact with during operation. The components shown in FIG. 1 are described in brief, and with an emphasis on function for the sake of simplicity. The components within FIG. 1 are communicatively coupled to each other in a manner appropriate for carrying out their respective functions within the operating environment 100. Embodiments of the present invention are not limited by the communication protocols or formats used to facilitate communication between components, those mentioned are for the sake of enablement and not meant to be limiting.

Affiliated media server 112 and non-affiliated media server 116 may be combinations of hardware and software. The hardware aspect is a computing device that may include a CPU, short term memory, long term memory, and one or more network interfaces. The network interface is used to connect to a LAN, WAN (including the Internet), or other variety of communications network. The network interface to the WAN or LAN could be wired, wireless, or both. In one embodiment, software on affiliated media server 112 and non-affiliated media server 116 allows them to transmit media content (e.g. movies, videos, MP3's, etc.) to mobile device 130. The affiliated media server 112 and non-affiliated media server 116 transmit the media content over the packet switched network 118. Affiliated media server 112 is affiliated with the entity providing the mobile communication service to mobile device 130. A media server is affiliated with an entity if it is owned or operated by the entity, or by a third party that has an agreement with the entity. Non-affiliated media server 116 is not affiliated with the entity providing the mobile communication service to mobile device 130. The non-affiliated media server 116 may communicatively couple to mobile device 130 via the Internet.

IP Multimedia Subsystem network (IMS) 114 is a standardized architecture for telecom operators who want to provide mobile, fixed multimedia, and other services. It supports a Voice-over-Packet (VoP) implementation based on a 3GPP standardized implementation of the session initiation protocol (SIP) that can run over the standard Internet Protocol (IP). Existing phone systems (both packet-switched and circuit-switched) can be supported by the IMS 114 including authorization, call routing, and accounting features. IMS 114 uses open standard IP protocols, defined by the IETF (Internet Engineering Task Force). In one embodiment, the IMS 114 is used to establish a media connection between affiliated media server 112 and mobile device 130.

Packet Switched Network 118 is a network designed to carry data in the form of packets. Packet switched network 118, is a wide are network (WAN) and may include the Internet.

Packet Data Server Node (PDSN) 120 acts as the connection point between base station 128 and packet switched network 118. PDSN 120 provides a routing function for IP packets, and manages the session between packet switched network 118 and base station 128.

Base station 128 is a fixed station used for communicating with mobile device 130. Standard air interface protocols, such as code division multiple access ("CDMA"), global system for mobile communications ("GSM"), or time division multiple access ("TDMA"), as well as others, may be used by base station 128 to communicate with mobile device 130. Other network communication interface arrangements are also possible. A base station controller (not shown) is responsible for handling traffic and signaling with mobile device 130. Only one base station 128 is shown, and without its many components, for the sake of clarity. Mobile device 130 could be in simultaneous communication with multiple base stations.

Mobile device 130 is a wireless terminal that is adapted to receive communications and media over the wireless networks included in operating environment 100. Some lower-level details of mobile device 130 are not shown so as to not obscure embodiments of the present invention. For example, mobile device 130 may include a bus that directly or indirectly couples the following devices: memory: one or more processors, one or more presentation components such as a display or speaker, input/output (I/O) ports, I/O components, and a power supply such as a battery. The display device is suitable for viewing media content such as movies, videos, video calls, or television shows. A LCD screen is one example of a display that might be used on the mobile device 130. Mobile device 130 may communicate via wireless protocols, such as code division multiple access ("CDMA"), global system for mobile communications ("GSM"), or time division multiple access ("TDMA"), as well as others, to communicate with base station 128.

Mobile device 130 may take on any of a variety of forms. By way of example, mobile device 130 may be a mobile telephone, smart phone, pager, computing device, personal digital assistant ("PDA") or any combination of these or other devices. Mobile device 130 has the ability to present one or more forms of media content. Examples of media content that could be displayed include, TV shows, movies, videos, MP3 files, and radio programs. This list is not exhaustive. The media may be presented as it is received from the wireless network or from memory within mobile device 130. Mobile device 130 may also be capable of receiving one or more forms of communication. Examples of communications that may be received include phone calls, video calls, text messages, multimedia messages, emails, calendar updates, and task reminders.

User 132 is a person who is associated with mobile device 130. For example, a phone call placed to mobile device 130 would typically be intended for user 132. User 132 is the ultimate recipient of communications (e.g. emails, phone calls, text messages) and media content sent to mobile device 130.

Home location register (HLR) 122 helps route calls and text messages and ensure security. HLR 122 has a built in authentication center, which is a database of subscriber information, including access rights and services subscribed to. Other components within operating environment 100 communicate with HLR 122 to determine the location of mobile device 130.

Mobile switching center (MSC) 124 provides services and coordination between mobile device 130 in a network and external networks such public switched telephone network (PSTN) 126.

Figure 2:
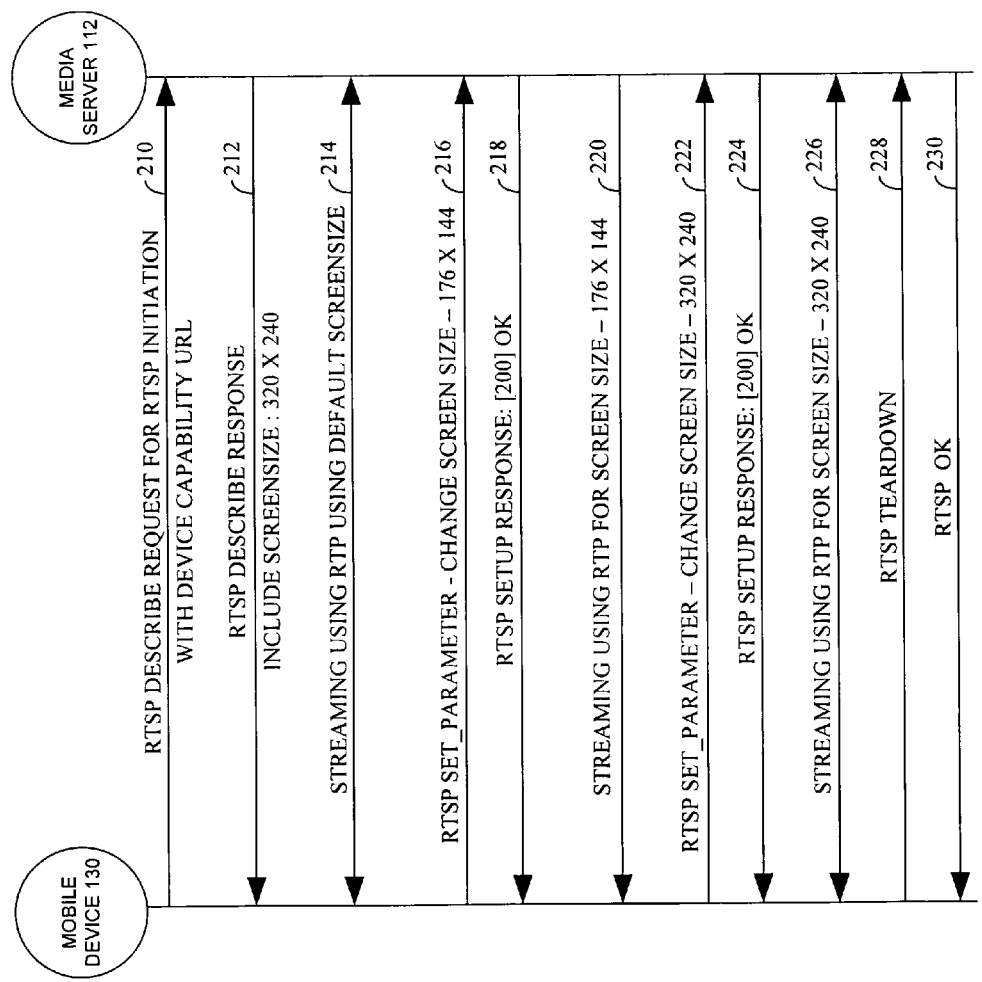
FIG. 2 is a drawing illustrating communications occurring between a mobile device and a content provider, according to an embodiment of the present invention.

Turning now to FIG. 2, a chart showing communications occurring between mobile device 130 and affiliated media server 112 is shown in accordance with embodiments of the present invention. The mobile device 130 and the affiliated media server 112 have been described previously with reference to FIG. 1. Affiliated media server 112 is included in these illustrative communications for the sake of illustration. Similar communications could occur between the mobile device 130 and the non-affiliated media server 116. The communications between the mobile device 130 and the affiliated media server 112 occur over a mobile-communications network that includes numerous components that are not shown in FIG. 2 for the sake of simplicity. An illustrative operating environment has been described previously with reference to FIG. 1.

The communications described in FIG. 2 occur using the Real Time Streaming Protocol (RTSP). The RTSP protocol is used to send control communications between a media presentation device (e.g. mobile device 130) and a content provider such as media server 112. The RTSP protocol does not include the streaming of the media data itself. The media data is sent using a separate protocol such as RTP. Though FIG. 2 is described using the RTSP protocol and the RTP transfer protocol, the invention is not intended to be limited to using these protocols. Other communication protocols or transport protocols may be used.

To initiate the media session, the mobile device 130 sends an RTSP initialization message 210 to the affiliated media server 112. In one embodiment, the RTSP initialization message 210 includes a link to a URL containing capabilities for the mobile device 130. The RTSP initialization message may also include information about the requested media content. In response to the RTSP initialization message 210, the affiliated media server 112 sends an RTSP response 212. The RTSP response 212 includes the screen size of the mobile device 130 retrieved from the URL. In FIG. 2, the screen size is shown as 320×240 pixels. Additional messages and responses may be used to set up the initial media session. Once the media session is set up, the affiliated media server 112 begins streaming the media content 214 to the mobile device 130. The initial media stream is based on the default screen size. As described previously, the media is streamed using a transfer protocol such as RTP.

During the media session, the mobile device 130 sends a first change-screen-size message 216 to the affiliated media server 112. In one embodiment, the first change-screen-size message 216 uses the RTSP Set_Parameter command. The first change-screen-size message 216 will include the new screen size. FIG. 2 shows the new screen size as 176×144 pixels. The new screen size may be requested using pixels, or other unit of measure. In the embodiment where the RTSP Set_Parameter command is used, the media server will need to be programmed to understand the meaning of the RTSP Set_Parameter command including a new screen size during a media session. In addition, other components transferring the RTSP Set Parameter message may need to be programmed to interpret the message as valid and transmit it to the appropriate component.

In response to receiving the first change-screen-size message 216, the affiliated media server 112 will search through existing copies of the requested media content to determine if one of them matches the requested screen size. If a matching media content having the correct screen size is found, that media will be streamed to the mobile device 130. If matching media content is not found, the affiliated media server 112 may identify the closest existing media (i.e. the best fit) to the requested screen size. In one embodiment, the closest existing media that is larger than the requested screen size is chosen to transmit to the mobile device 130.

In response to the first change-screen-size message 216, an acknowledgement message 218 is sent from the affiliated media server 112 to the mobile device 130. The affiliated media server 112 then begins streaming the selected media content 220 with the new screen size to the mobile device 130.

The mobile device 130 may request several different screen sizes during a single media session. In FIG. 2, a second change-screen-size message 222 is sent to the affiliated media server 112. In this case, the screen size shown in FIG. 2 is 320×240, which is the default screen size. However, the second change-screen-size message 222 is not limited to restoring the media stream to the original size. As with the first change-screen-size message 216, the affiliated media server 112 sends an acknowledgement message 224 in response. The affiliated media server 112 will find an exact match for the screen size, if available, or a nearly matching media content if an exact match is not available. The affiliated media server 112 then begins streaming 226 it to the mobile device 130. In order to conclude the media session, the mobile device 130 sends a tear down message 228 to the affiliated media server 112. In response, the affiliated media server 112 sends an acknowledgement message 230 to the mobile device 130 and terminates the media session.

Figure 3:
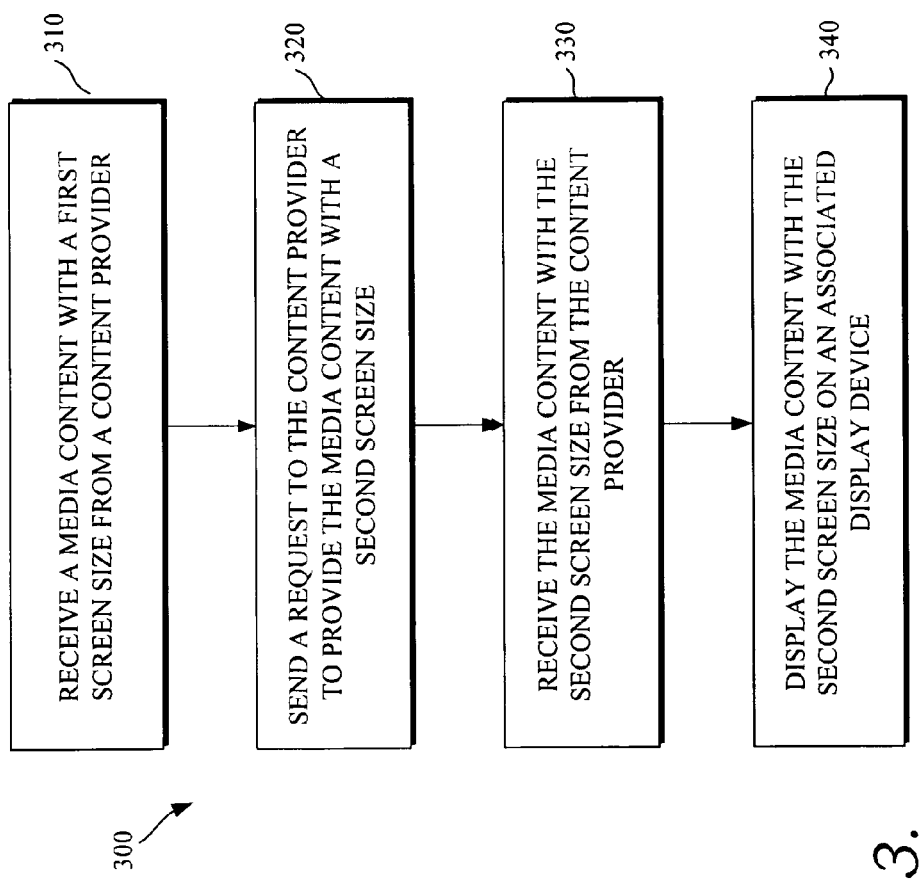
FIG. 3 is a flow diagram in which a method of changing a screen size for a media content presented on a mobile device is described, according to an embodiment of the present invention.

Turning now to FIG. 3, a method 300 of changing a screen size for a media content during a media session is shown, in accordance with an embodiment of the present invention. In one embodiment, method 300 is performed by a mobile device receiving media content from a content provider. At step 310, a media content with a first screen size is received from a content provider. The media content may be a movie, television show, video, or other media content. The first screen size may be the default screen size for the mobile device receiving the media content. As described previously, the default screen size may be retrieved from an online profile by the content provider. The media content may be transferred using RTP or other suitable transfer protocols. In one embodiment, the transmission is received through a wireless connection. The content provider is any device capable of transmitting media to the mobile device. The content provider may store collections of media or retrieve the media from other storage devices. The content provider may be a media server, such as affiliated media server 112 or non-affiliated media server 116.

At step 320, a request is sent to the content provider to provide the media content having a second screen size that is different than the first screen size. In one embodiment, the request is sent from the mobile device while it is still receiving the media content having the first size. The mobile device may change the screen size in response to instructions to zoom the media presentation to only a portion of the media content, providing a picture-in-picture display, or providing a partial screen display so that the media content can share screen space with other media content or allow other functions of the mobile device to be used simultaneously with the media presentation. Other reasons for adjusting the screen size on the mobile device are possible. In one embodiment, the mobile device has already changed the display of the media content to match the second screen size at the time the request is sent. Thus, the mobile device may present the media content in a new screen size while still receiving the media content having the first screen size. Requesting the second screen size allows the network to optimize bandwidth utilized by the mobile device when the requested screen size is smaller. The user viewing the media content may not be aware that the size of the content being sent to the mobile device has changed.

In response to the request for a second screen size, at step 330 the media content with the second screen size is received from the content provider. The content provider may have a collection of the media content in various sizes. If the media content is not available in the second size, the media in the collection having the size closest to the second size is sent to the mobile device. The media content having the first size is no longer received by the mobile device once it starts receiving the media content having the second size. At step 340, the media content with the second screen size is displayed on the mobile device. In one embodiment, the user should not notice that the media size received by the mobile device has changed because the display of the media content has already been changed to match the second size. In another embodiment, the display of media content is not changed until the media content having the second size is received.

In one embodiment, the first screen size is the default screen size for the mobile media device on which the media content is displayed. The default screen size may be retrieved from a profile accessed by the content provider. As stated previously, the second screen size may be customized based on events occurring on the display device such as zooming to a portion of the media device, picture-in-picture, a split screen, or any other screen adjustment including allocating a portion of the screen to a different application. In one embodiment, the request to send the media content with the second screen size is generated by a media player running on the mobile device.

Figure 4:
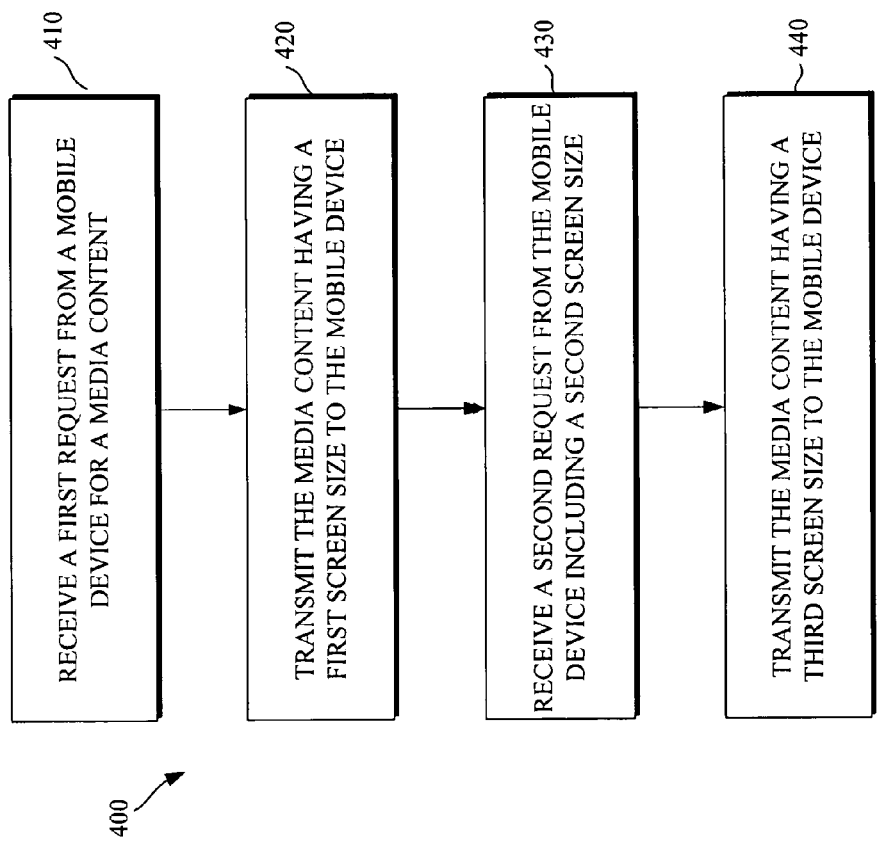
FIG. 4 is a flow diagram in which a method of changing a screen size of a media stream sent from a content provider to a mobile device is described, according to an embodiment of the present invention.

Turning now to FIG. 4, a method 400 of changing a screen size of a media content sent from a content provider to a mobile device is shown, in accordance with an embodiment of the present invention. At step 410, a first request for a media content is received from a mobile device. The types of media content that may be requested have been described previously.

At step 420, the media content having a first screen size is transmitted to the mobile device. The transmission of the media content to the mobile device is over a wireless connection. The first screen size may correspond with a default screen size for the mobile device. In one embodiment, the default screen size is retrieved from an online profile associated with the mobile device. The content provider is any device capable of transmitting media to the mobile device. The content provider may store collections of media or retrieve the media from other storage devices. The content provider may be a media server, such as affiliated media server 112 or non-affiliated media server 116.

At step 430, a second request is received from the mobile device including a second screen size. The second request is received during transmission of the media content having the first screen size to the mobile device. In response to the second request, media content matching or nearly matching the second screen size may be located. The content provider may first determine that a media content matching the second size is not available in a collection of the media content having various sizes. Upon this determination, the content provider determines which media content in the collection is closest to the second size. In one embodiment, the closest content must be larger than the second size. At step 440, media content having a third size is transmitted to the mobile device. The media content has a third screen size that either matches or nearly matches the requested second screen size.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-storage media having computer-executable instructions embodied thereon for performing a method of changing a screen size for a media content during a media session presented on a mobile device, the method comprising:
  establishing a media session between the mobile device and a content provider, wherein establishing the media session comprises the content provider communicating a first screen size for receiving the media content to the mobile device, wherein the first screen size is a parameter at the content provider for changing a screen size of the media content;
  during the media session, receiving the media content with the first screen size from the content provider, wherein the media content is a streaming video;
  during the media session, receiving a user indication to perform one of the following to the media display on the mobile device, wherein the mobile device is receiving media content having the first screen size:
   (1) zoom the media presentation to a portion of the media content,
   (2) provide a picture-in-picture display of the media content, and
   (3) provide a partial screen display of media content;
  during the media session, in response to the user indication, changing the media content display on the mobile device from the first screen size to a second screen size, wherein the mobile device is still receiving the media content having the first screen size;
  during the media session, subsequent to said changing, sending a request to the content provider to provide the media content with a second screen size, wherein the first screen size is different from the second screen size;
  during the media session, in response to the request, receiving the media content with the second screen size from the content provider without discontinuing the media session in which the media content with the first screen size is streaming; and
  during the media session, displaying the media content with the second screen size on the mobile device, wherein the mobile device is receiving the media content having the second screen size based on setting the parameter at the content provider.

2. The media of claim 1, wherein the request is an Real-Time Streaming Protocol ("RTSP") message.

3. The media of claim 2, wherein the request is an RTSP SET_Parameter command.

4. The media of claim 1, wherein the request is generated by a media player running on the mobile device.

5. The media of claim 1, wherein the first screen size is a default screen size for the mobile device.

6. The media of claim 5, wherein the first screen size is stored in a profile for the mobile device, wherein the profile is accessed by the content provider.

7. The media of claim 5, wherein the second screen size is a custom screen size that is different from the default screen size.

8. One or more non-transitory computer-storage media having computer-executable instructions embodied thereon for performing a method of changing a screen size of a media content sent from a content provider to a mobile device, the method comprising:
  establishing a media session between the mobile device and the content provider, wherein establishing the media session comprises the content provider communicating a first screen size for receiving the media content to the mobile device, wherein the first screen size is identified from capabilities of the mobile device and stored as a parameter at the content provider for changing a screen size of the media content;
  during the media session, receiving the first request from the mobile device for the media content, wherein the media content is a video;
  during the media session, transmitting the media content having a first screen size to the mobile device based on setting the parameter at the content provider, wherein the mobile device receives the media content over a wireless connection;
  during the media session and during transmission of the media content having the first screen size, receiving a second request from the mobile device including a second screen size;
  determining that the media content having the second screen size is not available in a collection of the media content having a plurality of different sizes;
  determining that the media content having the third screen size is closest to the second screen size within the collection of the media content; and
  during the media session, transmitting the media content having the third screen size to the mobile device without discontinuing a media session in which the media content with the first screen size is streaming based on setting the parameter at the content provider, wherein the third screen size is different than the first and second screen size.

9. The media of claim 8, wherein the second request is a Real-Time Streaming Protocol ("RTSP") SET_Parameter command.

10. The media of claim 9, wherein the media content having the third screen size is at least one of: equal to the second screen size and a closest available screen size to the second screen size.

11. The media of claim 8, further comprising, subsequent to receiving the second request, discontinuing transmission of the media content having the first screen size.

12. The media of claim 8, wherein the first screen size is a default screen size for the mobile device.

13. The media of claim 8, wherein the third screen size is larger than the second screen size and smaller than the first screen size.

14. A computerized system for transmitting media content to a mobile device, the system comprising:
  a content provider communicatively coupled to a wireless communications network that is communicatively coupled to the mobile device, the content provider including an interface to:
    (1) receive a first request from the mobile device to initiate transmission of the media content, wherein the first request contains a link to a Uniform Resource Locator ("URL") with capabilities of the mobile device, wherein the media content is a video;
    (2) communicate a response that includes a first screen size of the mobile device retrieved from the URL, wherein the first screen size is identified from the capabilities of the mobile device and stored as a parameter at the content provider for changing a screen size of the media content;
    (3) stream the media content with the first screen size based on the capabilities of the mobile device to the mobile device,
    (4) subsequent to receiving the first request, receive a second request from the mobile device to change screen size of the media content to a second screen size, wherein the second request includes the second screen size, and wherein the first screen size is different than the second screen size, and
    (5) stream the media content with the second screen size to the mobile device without discontinuing a media session in which the media content with the first screen size is streaming based on setting the parameter at the content provider.

15. The media of claim 14, wherein the first request and the second request are a Real-Time Streaming Protocol ("RTSP") message.

16. The media of claim 15, wherein the first request and the second request are a RTSP SET_Parameter command.

17. The media of claim 14, wherein the first screen size is a default screen size for the mobile device.

18. The media of claim 17, wherein the first screen size is stored in a profile for the mobile device, wherein the profile is accessed by the content provider.

19. The media of claim 17, wherein the second screen size is a custom screen size that is different from the default screen size for the mobile device.

* * * * *